United States Patent
Lee et al.

(10) Patent No.: US 12,288,909 B2
(45) Date of Patent: Apr. 29, 2025

(54) METHOD FOR MANUFACTURING MEMBRANE-ELECTRODE ASSEMBLY USING NANO-DISPERSED IONOMER BINDER, AND MEMBRANE-ELECTRODE ASSEMBLY MANUFACTURED THEREBY

(71) Applicant: DANKOOK UNIVERSITY CHEONAN CAMPUS INDUSTRY ACADEMIC COOPERATION FOUNDATION, Cheonan-si (KR)

(72) Inventors: Chang Hyun Lee, Seongnam-si (KR); Jun Hyun Lim, Gyeongju-si (KR)

(73) Assignee: DANKOOK UNIVERSITY CHEONAN CAMPUS INDUSTRY ACADEMIC COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 18/281,447

(22) PCT Filed: Apr. 12, 2022

(86) PCT No.: PCT/KR2022/005286
§ 371 (c)(1),
(2) Date: Sep. 11, 2023

(87) PCT Pub. No.: WO2022/225246
PCT Pub. Date: Oct. 27, 2022

(65) Prior Publication Data
US 2024/0162465 A1    May 16, 2024

(30) Foreign Application Priority Data
Apr. 19, 2021    (KR) .......... 10-2021-0050479

(51) Int. Cl.
*H01M 8/1004* (2016.01)
*C25B 9/23* (2021.01)
*H01M 8/10* (2016.01)

(52) U.S. Cl.
CPC ............ *H01M 8/1004* (2013.01); *C25B 9/23* (2021.01); *H01M 2008/1095* (2013.01)

(58) Field of Classification Search
None
See application file for complete search history.

(56) References Cited

U.S. PATENT DOCUMENTS

2020/0127299 A1*   4/2020   Shintani ............. H01M 8/1004
2020/0340457 A1*  10/2020   Ukai ..................... B01D 63/08

FOREIGN PATENT DOCUMENTS

KR    10-2016-0128134 A    11/2016
KR       101688625 B1 *    12/2016
(Continued)

OTHER PUBLICATIONS

Machine translation of KR101688625B1 (Year: 2016).*
(Continued)

*Primary Examiner* — Shamim Ahmed
*Assistant Examiner* — Bradford M Gates
(74) *Attorney, Agent, or Firm* — Morgan, Lewis & Bockius LLP

(57) ABSTRACT

The present invention relates to a method for manufacturing a membrane-electrode assembly and a membrane-electrode assembly manufactured thereby, and more specifically, to a method for manufacturing a membrane-electrode assembly by using a nano-dispersed ionomer binder under supercritical conditions in a mixed solvent comprising alcohol and water, and a membrane-electrode assembly manufactured thereby and a fuel cell or water electrolysis device comprising same.

14 Claims, 7 Drawing Sheets

(56) References Cited

FOREIGN PATENT DOCUMENTS

| | | |
|---|---|---|
| KR | 10-1764069 B1 | 8/2017 |
| KR | 10-2019-0057785 A | 5/2019 |
| KR | 10-2021-0034900 A | 3/2021 |

OTHER PUBLICATIONS

Ahn, Chi-Y eong et al. Enhancement of service life of polymer electrolyte fuel cells through application of nanodispersed ionomer. Science Advances. Jan. 31, 2020, vol. 6, No. 5, eaaw0870 (inner pp. 1-9). See abstract; pp. 1-3. 5. 7 and 8; and figure 3.
International Search Report (with translation) and Written Opinion issued in corresponding International Patent Application No. PCT/KR2022/005286, dated Jul. 18, 2022.

\* cited by examiner

[FIG. 1]
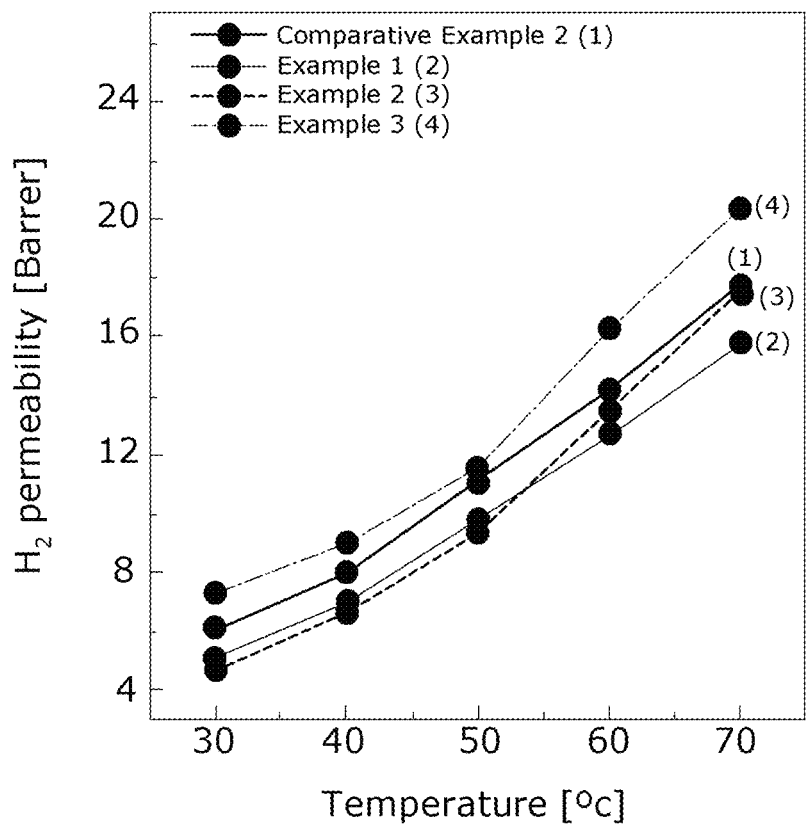

[FIG. 2]
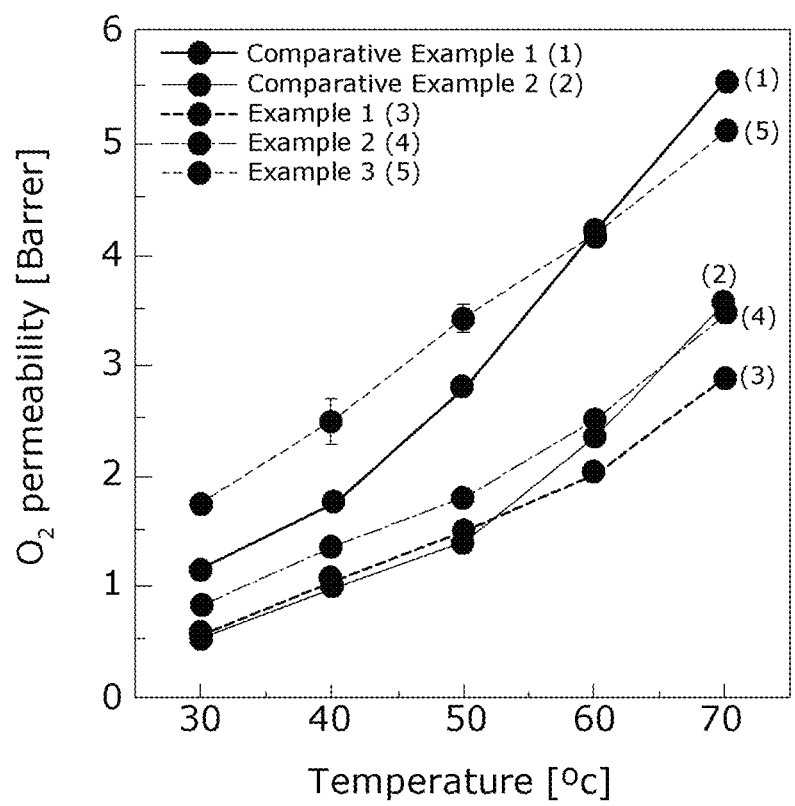

[FIG. 3]
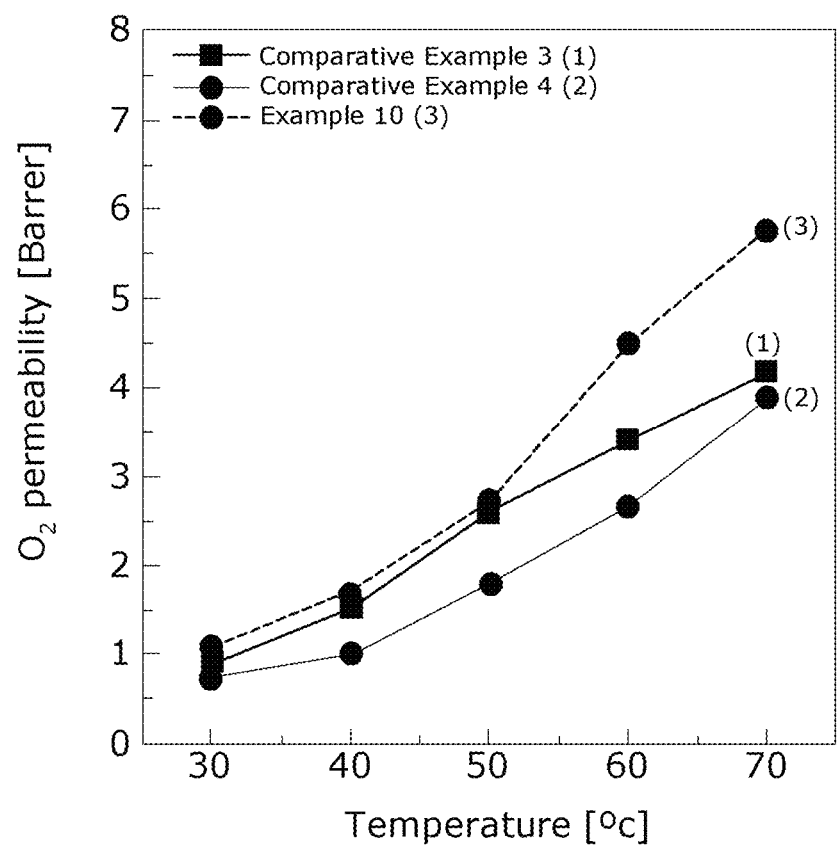

[FIG. 4]
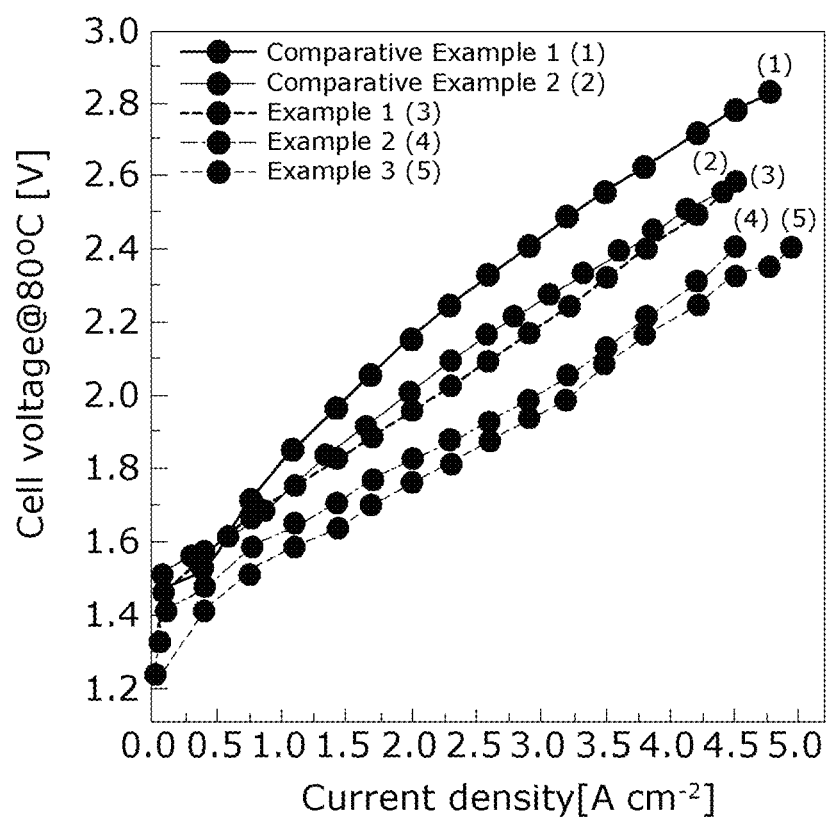

[FIG. 5]
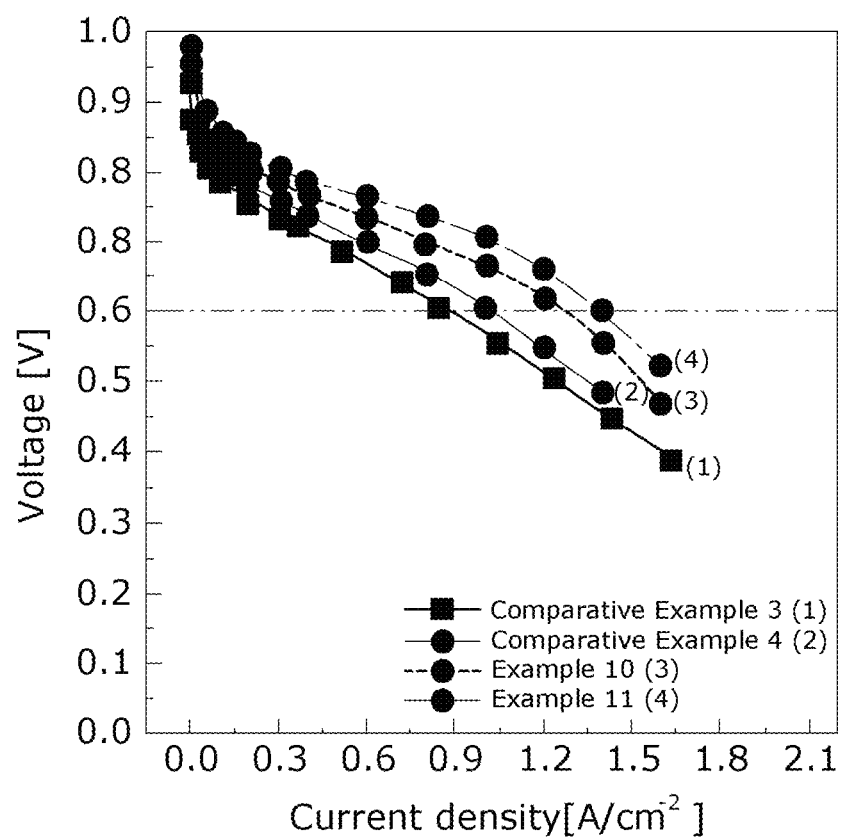

[FIG. 6]
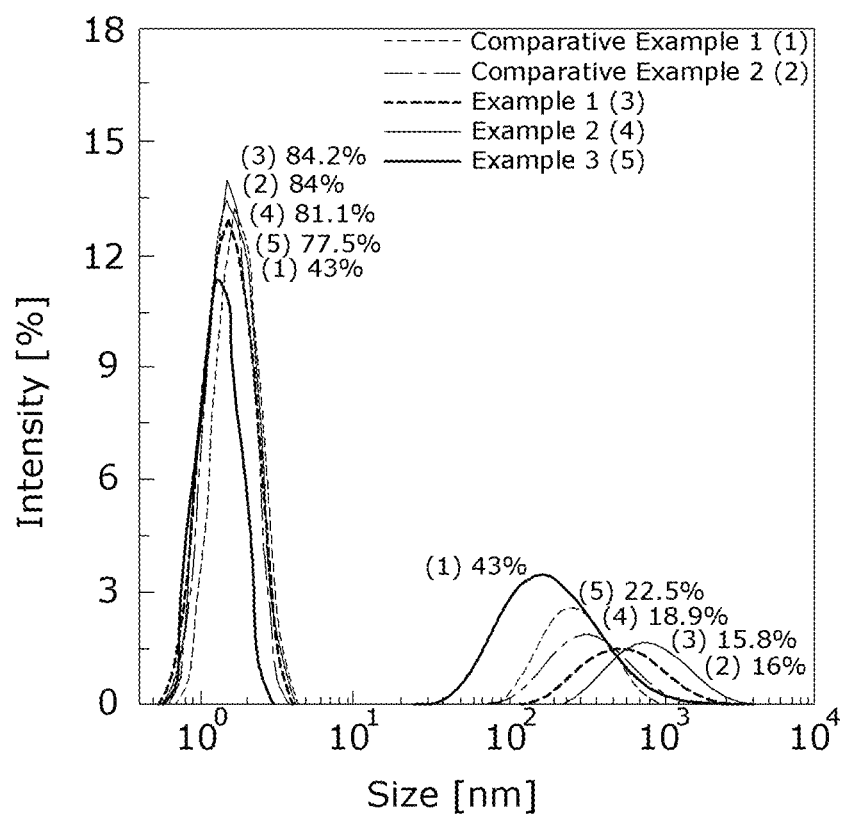

[FIG. 7]
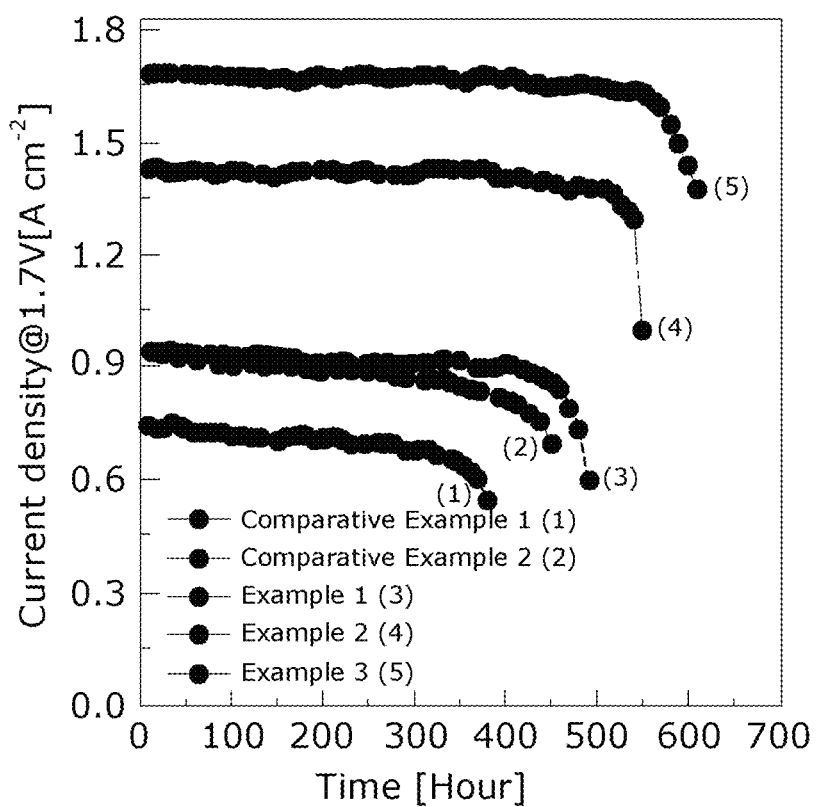

METHOD FOR MANUFACTURING MEMBRANE-ELECTRODE ASSEMBLY USING NANO-DISPERSED IONOMER BINDER, AND MEMBRANE-ELECTRODE ASSEMBLY MANUFACTURED THEREBY

TECHNICAL FIELD

The present invention relates to a method for manufacturing a membrane-electrode assembly and a membrane-electrode assembly manufactured thereby, and more specifically, to a method for manufacturing a membrane-electrode assembly by using a nano-dispersed ionomer binder under supercritical conditions in a mixed solvent comprising alcohol and water, and a membrane-electrode assembly manufactured thereby and a fuel cell or water electrolysis device comprising same.

BACKGROUND ART

A fuel cell or water electrolysis device using a polymer electrolyte membrane basically undergoes a reaction through a membrane-electrode assembly. A membrane-electrode assembly (MEA) has a structure in which a polymer electrolyte membrane is interposed between an anode and a cathode.

The electrochemical performance of a polymer electrolyte membrane fuel cell (PEFC) or polymer electrolyte membrane water electrolysis (PEMWE) is greatly affected by a core material such as a polymer electrolyte, a catalyst, and an electrode binder made of perfluorinated sulfonic acid (PFSA) ionomer. The redox reaction in PEFC or PEMWE mainly takes place at an electrode interface called a triphase boundary (TPB) where metal catalyst particles and PFSA ionomers connecting the particles are in contact. Until now, the development of fuel cells or water electrolysis catalysts has been focused on the development of catalysts that form an anode or a cathode, and studies have been conducted to improve performance and lifespan characteristics through various catalyst synthesis methods. However, unlike the results showing the improved performance or durability by 2 to 130 times through half-cell reactions in the laboratory, when the synthesis method was applied to membrane-electrode assembly (MEA) for actual unit cell applications, significantly inferior results were obtained compared to the results obtained when applying the half cell.

On the other hand, an ionomer in an electrode is a factor that significantly affects the performance of the MEA, and the performance and durability of a fuel cell or water electrolysis device can be improved by controlling the properties of the ionomer. The ionomer, called an electrode binder, not only assists in the transfer of protons in the porous electrode, but also serves as a physical support for a carbon material with a high surface area in which nanoparticled metal catalysts are dispersed. In addition, the ionomer introduced for manufacturing the electrode significantly contributes to the electrochemical performance of PEFC or PEMWE compared to electrodes without ionomer.

PFSA ionomer (e.g., Nafion) is a representative ionomer material, which is composed of a hydrophobic polytetrafluoroethylene backbone with chemical resistance and a perfluorinated side chain containing a hydrophilic sulfate group ($-SO_3H$). This unique chemical structure leads to a well-developed hydrophilic-hydrophobic microphase separation morphology for fast proton conduction. In addition, fluorine, which has a very high electronegativity, facilitates the dissociation of protons from sulfate groups. The ionomer is mainly provided in a form dispersed in an aqueous aliphatic alcohol solution, and maintains the inactivity of the platinum catalyst particles during electrode formation. Until now, most of the PEFC or PEMWE electrodes have been manufactured using a Nafion dispersion, but an electrode containing Nafion introduced in a dispersion state has a problem in that it does not provide durability enough to contribute to long-term performance.

Until now, many researchers have tried to overcome these technical problems through chemical or physical methods. Chemical methods made by most chemical companies are based on inducing changes in physical properties by modifying the chemical structure of the side chain of PFSA ionomer from the point of view of polymer synthesis. On the other hand, the physical method related to the electrode binder has mainly been a method of changing the solvent composition or content of the ionomer dispersion. However, it has not been reported that the ionomer is nano-dispersed under specific conditions and applied as an electrode binder by adjusting the dispersion characteristics of the ionomer particles.

DISCLOSURE

Technical Problem

An object of the present invention is to improve the electrochemical performance and durability of a polymer electrolyte fuel cell or a water electrolysis device by introducing nano-dispersed ionomer as a binder of an electrode composition under supercritical conditions.

Technical Solution

In order to solve the above technical problems, the present invention provides a method for manufacturing a membrane-electrode assembly in which a polymer electrolyte membrane is interposed between a cathode and an anode, comprising the steps of forming a cathode by applying a first electrode composition comprising an ionomer binder, a catalyst, and a solvent on one surface of the polymer electrolyte membrane; and a forming an anode by applying a second electrode composition comprising an ionomer binder, a catalyst and a solvent to the other surface of the polymer electrolyte membrane, wherein at least one of the ionomer binders of the first electrode composition and second electrode composition is an ionomer binder nano-dispersed under a supercritical condition in a mixed solvent comprising alcohol and water. In this case, the ionomer binder, catalyst, and solvent of the first electrode composition and the ionomer binder, catalyst, and solvent of the second electrode composition may be the same or different from each other.

In addition, the present invention provides a membrane-electrode assembly manufactured using the nano-dispersed ionomer as a binder under the supercritical condition and a fuel cell or water electrolysis device comprising the same.

Advantageous Effects

According to the present invention, it was confirmed that the electrochemical characteristics and durability of the electrode using the nano-dispersed ionomer as a binder under supercritical conditions were improved. The nano-dispersed ionomer secures excellent gas permeability and ion conductivity as an electrode binder ionomer through the unique dispersion characteristics obtained through supercritical conditions, and thus improves the mass transfer characteristics, greatly improving fuel cell or water electrolysis performance.

In addition, the nano-dispersed ionomer according to the present invention has excellent dispersion characteristics in the electrode layer, and as a result of comparing with the voltage loss rates of commercially available ionomer dispersion and ionomer manufactured by the conventional art without application of nanodispersion, the nano-dispersed ionomer according to the present invention shows a small voltage loss rate, resulting in improved performance.

As described above, by controlling the dispersion characteristics of the ionomer under supercritical conditions through the present invention, the electrode performance and durability of a polymer electrolyte fuel cell or water electrolysis device can be improved without developing a separate catalyst.

DESCRIPTION OF DRAWINGS

FIGS. 1 to 3 are graphs showing the hydrogen and oxygen permeation behavior of ionomers prepared in the form of films according to Examples and Comparative Examples of the present invention.

FIGS. 4 and 5 are graphs showing current-voltage curves of MEAs manufactured by introducing ionomers according to Examples and Comparative Examples of the present invention into a cathode.

FIG. 6 is a graph showing particle distribution of an electrode to which ionomers according to Examples and Comparative Examples of the present invention are applied as a binder for an electrode.

FIG. 7 is a graph showing a durability evaluation result of PEMWE manufactured by applying ionomers according to Examples and Comparative Examples of the present invention as an electrode binder.

MODE FOR INVENTION

The present invention will be described in more detail through the following Examples and drawings.

The present invention relates to a method for manufacturing a membrane-electrode assembly using a nano-dispersed ionomer binder under supercritical conditions in a mixed solvent comprising alcohol and water, a membrane-electrode assembly manufactured thereby, and a fuel cell or water electrolysis comprising the same.

Specifically, the present invention is a method for manufacturing a membrane-electrode assembly in which a polymer electrolyte membrane is interposed between a cathode and an anode. The method comprises the steps of forming a cathode by applying a first electrode composition comprising an ionomer binder, a catalyst, and a solvent on one surface of the polymer electrolyte membrane; and a forming an anode by applying a second electrode composition comprising an ionomer binder, a catalyst and a solvent to the other surface of the polymer electrolyte membrane, wherein at least one of the ionomer binders of the first electrode composition and second electrode composition is an ionomer binder nano-dispersed under supercritical conditions in a mixed solvent comprising alcohol and water.

In the present invention, the ionomer binder, catalyst, and solvent constituting the first electrode composition and the ionomer binder, catalyst, and solvent constituting the second electrode composition may be the same or different from each other depending on the purpose. Only one of the cathode or anode electrodes may be prepared using the ionomer nanodispersion binder, or both cathode and anode electrodes may be prepared by applying the ionomer nanodispersion binder.

When the nano-dispersed ionomer is introduced into both electrodes as an electrode binder, excellent gas permeability is secured through the unique dispersion characteristics obtained through the supercritical dispersion process, improving fuel gas transfer (mass transfer) characteristics to the catalyst in each electrode. The ionomer is uniformly dispersed in the electrode catalyst layer to form an effective morphology for hydrogen ion conduction, enabling rapid hydrogen ion transfer. In addition, through uniform morphology formation, it is possible to contribute to fuel cell performance improvement and durability by suppressing the aggregation of catalyst particles generated during long-term operation and minimizing the loss of catalytic active area due to aggregation.

The ionomer usable in the present invention may be at least one selected from among perfluorine-based ionomers, partial fluorine-based ionomers, and hydrocarbon-based ionomers, but is not particularly limited thereto.

Specifically, types of usable perfluorine-based ionomers include poly(perfluorosulfonic acid), poly(perfluorocarboxylic acid), a copolymer of tetrafluoroethylene and fluorovinyl ether containing a sulfonic acid group, and a mixture thereof, and commercially available products include commercially available Nafion, Flemion, Aciplex, 3M ionomer, Dow ionomer, Solvay ionomer, Sumitomo ionomer, and a mixture thereof, but are not particularly limited thereto.

In addition, examples of partial fluorine-based ionomer include sulfonated poly(arylene ethersulfone-co-vinylidene fluoride), sulfonated trifluorostyrene-grafted-poly(tetrafluoroethylene) (PTFE-g-TFS), styrene-grafted sulfonated polyvinylidene fluoride (PVDF-g-PSSA), a copolymer containing dicarfluorobiphenyl as a monomer, a copolymer containing hexafluorobenzene as a monomer, and a mixture thereof, but are not particularly limited thereto.

Meanwhile, examples of the hydrocarbon-based ionomer include homopolymers, alternating copolymers, random copolymers, block copolymers, multiblock copolymers and graft copolymers comprising at least one hydrocarbon selected from sulfonated imide, sulfonated aryl ether sulfone, sulfonated ether ketone, sulfonated benzimidazole, sulfonated sulfone, sulfonated styrene, sulfonated phosphazene, sulfonated ether ether sulfone, sulfonated ether sulfone, sulfonated ether benzimidazole, sulfonated arylene ether ketone, sulfonated ether ketone, sulfonated styrene, sulfonated imidazole, sulfonated ether ketone ketones, aryl ether benzimidazole, and a combinations thereof, and a mixture thereof, but are not particularly limited thereto.

In the present invention, an ionomer nano-dispersion is used as a binder used in an electrode composition together with a catalyst. In the present invention, supercritical conditions are used to improve the dispersion characteristics of the ionomer, and supercritical fluids above a critical point exhibit liquid-like solubility, very low surface tension, and gas-like permeability. Also, the density of the supercritical fluid can improve dissolution performance. Since the solute has a low viscosity in a supercritical fluid, mass transfer can be promoted, and thus, for example, perfluorinated ionomer can exhibit high solute diffusivity.

The solubility of these specific solutes may be further improved by introducing mixed solvents. In an embodiment of the present invention, water and alcohol were used as a co-solvent to improve the polarity and solvation strength of the supercritical fluid through the formation of hydrogen bonds. For example, the volume ratio of alcohol:water may be in the range of 55:45 to 99:1.

The alcohol usable in the present invention may include, for example, methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol, and a mixture thereof, but is not particularly limited thereto.

In addition, the mixed solvent may further include an organic solvent in addition to water and alcohol. Usable organic solvents include, for example, acetone, ethyl carbonate, propylene carbonate, diethyl carbonate, dimethyl carbonate, ethyl methyl carbonate, fluoroethylene carbonate, dimethylacetamide, dimethyl sulfoxide, dimethylformamide, N-methylpyrrolidone, a mixture thereof, and the like. In this case, the content of the organic solvent is preferably included in 0.01 to 40% by weight of the total dispersion.

In the supercritical condition applied to the ionomer nanodispersion of the present invention, a temperature is preferably in the range of 80 to 300° C., and the pressure is preferably in the range of 0.1 to 17.0 MPa, and the condition may vary depending on the type and ratio of the ionomer and alcohol used. The nano-dispersed ionomer binder within the above range exhibits unique dispersion characteristics, and as the electrode binder characteristics are improved thereby, it can contribute to improving the electrochemical performance and durability of PEFC or PEMWE. When the temperature is less than 80° C. or the reaction pressure is less than 0.1 MPa, the prepared ionomer binder does not have uniform dispersion characteristics, and on the contrary, when the temperature exceeds 300° C. or 17.0 MPa, economic efficiency is low because high-temperature and high-pressure reaction conditions must be maintained.

Meanwhile, in the present invention, since the size of the ionomer particles in the nanodispersion can be controlled by changing the ratio of alcohol to water and supercritical conditions, the present invention is more useful. The nano-dispersed ionomer binder comprised in the present invention is preferably in the range of 0.1 to 80% by weight based on the entire electrode composition. When the ionomer binder is introduced within the above range, the nano-dispersed ionomer is uniformly distributed in an electrode layer, thereby contributing to improving fuel cell performance. On the other hand, when the content of the nano-dispersed ionomer binder of the present invention is less than 0.1% by weight based on the total electrode composition, the small ionomer content makes it difficult to effectively distribute the ionomer inside the electrode layer, which may cause a problem in that PEFC or PEMWE performance is reduced. Conversely, when the content of the nano-dispersed ionomer binder exceeds 80% by weight, the gas supply into the electrode layer is not smooth due to excessive content of the ionomer, which may cause a problem in that PEFC or PEMWE performance is reduced.

Meanwhile, the catalyst constituting the electrode composition according to the present invention may be selected from a metal catalyst, a metal catalyst adsorbed on the surface of a carbon-based support, and a metal oxide catalyst.

Specifically, the metal that can be used as the catalyst in the present invention includes at least one metal nanoparticle selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and an alloy thereof, but is not particularly limited thereto.

In addition, as the catalyst comprised in the electrode composition according to the present invention, a metal catalyst adsorbed on the surface of the carbon-based support may be used. In this case, examples of the carbon-based support include carbon black, carbon nanotube, carbon nanofiber, carbon nanowire, carbon nanohorn, graphene, and the like. In the present invention, the metal catalyst adsorbed on the surface of the carbon-based support comprised in the electrode composition is preferably a catalyst such as platinum (Pt/C) adsorbed on the carbon support. Examples of other catalysts include palladium, rhodium, nickel, and the like. However, compared to these catalysts, a platinum (Pt/C) catalyst has the advantage of being the most excellent in cost performance.

In addition, as the metal oxide catalyst usable in the present invention, an oxide of at least one metal selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and an alloy thereof may be used, but is not particularly limited thereto. Among them, iridium (Ir) or iridium oxide ($IrO_2$) has the best durability among oxygen generating catalysts and is therefore preferred as an anode formation catalyst.

The present invention will be described in more detail through the following Examples. However, it should be understood that the following Examples are provided for illustrative purposes only and the scope of the present invention is not limited to the Examples.

Example 1

An ionomer nanodispersion (D-1) was prepared by dispersing an ionomer under supercritical conditions in a mixed solvent of NPA and water. 3M 725EW ionomer (3M, USA) was selected as an ionomer for the preparation of the nanodispersion, and NPA and $H_2SO_4$ (purity, 95.0 to 98.0%) were purchased from Aldrich Chemical Co., USA and prepared without further purification.

3M 725EW powder (weight, 13.0 g) was added to a glass liner containing 136.1 g of NPA and 111.4 g of ultrapure water (weight ratio 55:45). A high-pressure/high-temperature reactor (4560 Mini-Bench Reactor System, PARR, USA) was fitted with the glass liner, then the reaction mixture in the reactor was heated up to 300° C. with a heating rate of 4.25° C. $min^{-1}$, 1, and the reaction was maintained for 1 hour when the pressure reached 7 MPa. After cooling the reaction mixture slowly under atmospheric pressure (101.3 kPa), a nano-dispersion (D-1) was obtained. Finally, the nanodispersion was filtered using a filter paper having an average pore size of 5 to 10 μm.

After preparing the ionomer nanodispersion solution, an ionomer film sample excluding a catalyst and a carbon support was manufactured by a solution coating method to evaluate hydrogen and oxygen permeation behavior before introducing the ionomer nanodispersion solution into a water electrolysis electrode as an electrode binder. To this end, except for the catalyst and the carbon support, the nano-dispersed ionomer (D-1) manufactured above was cast on a glass plate, solidified in a vacuum oven set at 50° C. for 4 hours, and heat-treated at 220° C. for 1 hour to manufacture a film sample. Thereafter, the film sample was treated in a boiling 0.5 M $H_2SO_4$ aqueous solution for 2 hours and boiled in ultrapure water for 2 hours to remove excessive $H_2SO_4$ on the surface of the film sample, so that the film sample was prepared.

In addition, a membrane-electrode assembly (MEA) usable in a fuel cell or water electrolysis device was manufactured using the ionomer nanodispersion (D-1). A commercially available 40 wt % Pt/C catalyst (Johnson Matthey, UK) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion (D-1) was added to the ink slurry and mixed for another 30 minutes. A 7 cm×7 cm Nafion membrane (NR212, Chemours, USA) was prepared, and the ink slurry manufactured as described above was sprayed onto the layer on the cathode side at 0.4 mg $cm^2$. The MEA on the anode side was manufactured in the same way as the cathode, using 60 wt % iridium oxide (IrOxide, Boyas Energy, Korea) catalyst and 5 wt % ionomer nanodispersion. The amount of iridium oxide to be loaded was kept the same at 2 mg $cm^{-2}$ for all samples. Finally, the residual ink slurry was dried through a process of 6 hours at 30 to 100° C. to manufacture a membrane-electrode assembly.

Example 2

As in Example 1, 3M 725EW ionomer (3M, USA) was selected, and the reaction time was varied under supercritical conditions to manufacture an ionomer nanodispersion (D-2). Specifically, 3M 725EW powder (weight, 13.0 g) was added to a glass liner containing 136.1 g of NPA and 111.4 g of ultrapure water (weight ratio of 55:45). A high-pressure/high-temperature reactor (4560 Mini-Bench Reactor System, PARR, USA) was fitted with the glass liner, then the reaction mixture in the reactor was heated up to 300° C. with a heating rate of 4.25° C. $min^{-1}$, and the reaction was maintained for 2 hours when the pressure reached 7 MPa. After cooling the reaction mixture slowly under atmospheric pressure (101.3 kPa), a nano-dispersion (D-2) was obtained. Finally, the nanodispersion was filtered using a filter paper having an average pore size of 5 to 10 μm.

In addition, a film sample was manufactured in the same manner as in Example 1 using the ionomer nanodispersion (D-2), and a membrane-electrode assembly was manufactured.

Example 3

As in Example 1, 3M 725EW ionomer (3M, USA) was selected, and the reaction time was varied under supercritical conditions to manufacture an ionomer nanodispersion (D-3). Specifically, 3M 725EW powder (weight, 13.0 g) was added to a glass liner containing 136.1 g of NPA and 111.4 g of ultrapure water (weight ratio of 55:45). A high-pressure/high-temperature reactor (4560 Mini-Bench Reactor System, PARR, USA) was fitted with the glass liner, then the reaction mixture in the reactor was heated up to 300° C. with a heating rate of 4.25° C. $min^{-1}$, and the reaction was maintained for 3 hours when the pressure reached 7 MPa. After cooling the reaction mixture slowly under atmospheric pressure (101.3 kPa), a nano-dispersion was obtained. Finally, the nanodispersion was filtered using a filter paper having an average pore size of 5 to 10 μm.

In addition, a film sample was manufactured in the same manner as in Example 1 using the ionomer nanodispersion (D-3), and a membrane-electrode assembly was manufactured.

Example 4

The ionomer nanodispersion (D-3) and film sample were manufactured in the same manner as in Example 3. For manufacturing a membrane-electrode assembly, a commercially available 30 wt % Pd/C catalyst (Sigma-Aldrich, USA) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion was added to the ink slurry and mixed for another 30 minutes. A 7 cm×7 cm Nafion membrane (NR212, Chemours, USA) was prepared, and the ink slurry manufactured as described above was sprayed onto the layer on the cathode side at 0.4 mg $cm^{-2}$. The MEA on the anode side was manufactured in the same way as the cathode, using 60 wt % iridium oxide (IrOxide, Boyas Energy, Korea) catalyst and 5 wt % ionomer nanodispersion. The amount of iridium oxide to be loaded was kept the same at 2 mg $cm^{-2}$ for all samples. Finally, the residual ink slurry was dried through a process of 6 hours at 30 to 100° C. to manufacture a membrane-electrode assembly.

Example 5

The ionomer nanodispersion (D-3) and film sample were manufactured in the same manner as in Example 3. For manufacturing a membrane-electrode assembly, a commercially available 30 wt % Pd/C catalyst (Sigma-Aldrich, USA) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion was added to the ink slurry and mixed for another 30 minutes. A 7 cm×7 cm Nafion membrane (NR212, Chemours, USA) was prepared, and the ink slurry manufactured as described above was sprayed onto the layer on the cathode side at 0.4 mg $cm^{-2}$. The MEA on the anode side was manufactured in the same way as the cathode, using ruthenium oxide (Sigma-Aldrich, USA) catalyst and 5 wt % ionomer nanodispersion. The amount of ruthenium oxide to be loaded was kept the same at 2 mg $cm^{-2}$ for all samples. Finally, the residual ink slurry was dried through a process of 6 hours at 30 to 100° C. to manufacture a membrane-electrode assembly.

Example 6

The ionomer nanodispersion (D-3) and film sample were manufactured in the same manner as in Example 3. For manufacturing a membrane-electrode assembly, a commercially available 60 wt % Pt/C catalyst (VINATech, Korea) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion was added to the ink slurry and mixed for another 30 minutes. The ink slurry manufactured as described above was slot-die coated on a Kapton membrane at 0.4 mg $cm^{-2}$ to have a uniform thickness of a catalyst layer, and then dried at 100 to 150° C. for 1 hour or more. The anode side was manufactured in the same way as the cathode, using a 60 wt % iridium oxide (IrOxide, Boyas Energy, Korea) catalyst and 5 wt % ionomer nanodispersion. The amount of iridium oxide to be loaded was the same at 2 mg cm$^{-2}$ for all samples, and was prepared the same. A 7 cm×7 cm Nafion membrane (NR212, Chemours, USA) was prepared. An iridium oxide catalyst layer was stacked on the anode side and a Pt/C catalyst layer was stacked on the cathode side, and decal coating was performed on both sides of the electrolyte membrane using a hot press at a temperature of 100 to 200° C. and a pressure of 10 to 20 kgf/cm$^2$ to manufacture an electrode assembly.

Example 7

The ionomer nanodispersion (D-3) and film sample were manufactured in the same manner as in Example 3. For manufacturing a membrane-electrode assembly, a commercially available 60 wt % Pt/C catalyst (VINATech, Korea) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion was added to the ink slurry and mixed for another 30 minutes. A 7 cm×7 cm Nafion membrane (NR212, Chemours, USA) was prepared, and the ink slurry manufactured as described above was slot-die coated on the layer on the cathode side at 0.4 mg cm$^{-2}$, and then dried at 100 to 150° C. for 1 hour or more. The MEA on the anode side was manufactured in the same way as the cathode, using 60 wt % iridium oxide (IrOxide, Boyas Energy, Korea) catalyst and 5 wt % ionomer nanodispersion. The amount of iridium oxide to be loaded was kept the same at 2 mg cm$^{-2}$ for all samples. Finally, the residual ink slurry was dried through a process of 6 hours at 30 to 100° C. to manufacture a membrane-electrode assembly.

Example 8

The ionomer nanodispersion (D-3) and film sample were manufactured in the same manner as in Example 3. For manufacturing a membrane-electrode assembly, a commercially available 40 wt % Pt/C catalyst (Johnson Matthey, UK) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion was added to the ink slurry and mixed for another 30 minutes. A 7 cm×7 cm Nafion membrane (NR212, Chemours, USA) was prepared, and the ink slurry manufactured as described above was ink-jet printed on the layer on the cathode side at 0.4 mg cm$^{-2}$ using an ink-jet printer (Dimatix DPM-2800 series, Fujifilm, USA). The MEA on the anode side was manufactured in the same way as the cathode, using 60 wt % iridium oxide (IrOxide, Boyas Energy, Korea) catalyst and 5 wt % ionomer nanodispersion. The amount of iridium oxide to be loaded was printed the same as 2 mg cm$^{-2}$ for all samples.

Example 9

The ionomer nanodispersion (D-3) and film sample were manufactured in the same manner as in Example 3. For manufacturing a membrane-electrode assembly, a commercially available 40 wt % Pt/C catalyst (Johnson Matthey, UK) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion was added to the ink slurry and mixed for another 30 minutes. A 7 cm×7 cm Nafion membrane (NR212, Chemours, USA) was prepared, and the ink slurry manufactured as described above was brush-coated on the layer on the cathode side at 0.4 mg cm$^{-2}$ using a brush. The MEA on the anode side was manufactured in the same way as the cathode, using 60 wt % iridium oxide (IrOxide, Boyas Energy, Korea) catalyst and 5 wt % ionomer nanodispersion. The amount of iridium oxide to be loaded was kept the same at 2 mg cm$^{-2}$ for all samples. Finally, the residual ink slurry was dried through a process of 6 hours at 30 to 100° C. to manufacture a membrane-electrode assembly.

Example 10

An ionomer nanodispersion (D-4) was manufactured under supercritical conditions using an ionomer different from those in the above examples. 3M 800EW ionomer (3M, USA) was selected as an ionomer for the preparation of the nanodispersion, and NPA and H$_2$SO$_4$ (purity, 95.0 to 98.0%) were purchased from Aldrich Chemical Co., USA and prepared without further purification. 3M 800EW powder (weight, 13.0 g) was added to a glass liner containing 136.1 g of NPA and 111.4 g of ultrapure water (weight ratio 55:45). A high-pressure/high-temperature reactor (4560 Mini-Bench Reactor System, PARR, USA) was fitted with the glass liner, then the reaction mixture in the reactor was heated up to 300° C. with a heating rate of 4.25° C. min$^{-1}$, and the reaction was maintained for 2 hours when the pressure reached 7 MPa. After cooling the reaction mixture slowly under atmospheric pressure (101.3 kPa), a nanodispersion (D-4) was obtained. Finally, the nanodispersion was filtered using a filter paper having an average pore size of 5 to 10 μm.

After preparing the ionomer nanodispersion solution, an ionomer film sample excluding a catalyst and a carbon support was manufactured by a solution coating method to evaluate oxygen permeation behavior before introducing the ionomer nanodispersion solution into a fuel cell electrode as an electrode binder. To this end, except for the catalyst and the carbon support, the nano-dispersed ionomer (D-4) manufactured above was cast on a glass plate, solidified in a vacuum oven set at 50° C. for 4 hours, and heat-treated at 220° C. for 1 hour to manufacture a film sample. Thereafter, the film sample was treated in a boiling 0.5 M H$_2$SO$_4$ aqueous solution for 2 hours and boiled in ultrapure water for 2 hours to remove excessive H$_2$SO$_4$ on the surface of the film sample, so that the film sample was prepared.

In addition, a membrane-electrode assembly (MEA) usable in a fuel cell was manufactured using the ionomer nanodispersion (D-4). A commercially available 40 wt % Pt/C catalyst (Johnson Matthey, UK) was mixed with ultrapure water and isopropyl alcohol (IPA, Sigma-Aldrich, USA) using a homogenizer (VCX130, Sonics & Materials Inc., USA). Then, 5 wt % of the ionomer nanodispersion (D-4) was added to the ink slurry and mixed for another 30 minutes. A 7 cm×7 cm Nafion membrane (NR212, Chemours, USA) was prepared, and the ink slurry manufactured as described above was sprayed onto the layer on the cathode side. The MEA on the anode side was manufactured in the same way as the cathode, using 40 wt % Pt/C catalyst and commercially available ionomer binder D521 (Chemours, USA). The amount of Pt to be loaded was kept the same at 0.4 mg cm$^{-2}$ for all samples.

Example 11

The nanodispersion (D-4) was manufactured in the same manner as in Example 10, and a commercially available 40 wt % Pt/C catalyst (Johnson Matthey, UK) was added and mixed to ultrapure water and isopropyl alcohol (IPA, Sigma-Aldrich, USA) using a homogenizer (VCX130, Sonics &

Materials Inc., USA). Then, 5 wt % of the ionomer nanodispersion (D-4) was added to the ink slurry and mixed for another 30 minutes. A 7 cm×7 cm Nafion membrane (NR211, Chemours, USA) was prepared, the ink slurry manufactured as described above was sprayed on the layer on the cathode side, dried, and then MEA was manufactured on the layer of the anode side by a spray method using the same ink slurry as that of the cathode. The amount of Pt loaded on each electrode (anode and cathode) was kept the same at 0.4 mg cm$^{-2}$.

Comparative Example 1

A commercially available polymer electrolyte membrane was prepared as a film sample without manufacturing a separate ionomer nanodispersion. Specifically, a Nafion membrane (NR212, Chemours, USA) was used, treated in a boiling 0.5 M $H_2SO_4$ aqueous solution for 2 hours, and boiled in ultrapure water for 2 hours to remove excessive $H_2SO_4$ on the surface of the film sample, so that the film sample was prepared.

Meanwhile, for the preparation of a membrane-electrode assembly (MEA), a commercially available 40 wt % Pt/C catalyst (Johnson Matthey, UK) was mixed with ultrapure water and isopropyl alcohol (IPA, Sigma-Aldrich, USA) using a homogenizer (VCX130, Sonics & Materials Inc., USA). Then, a commercially available ionomer binder, 5 wt % of an ionomer dispersion (D521, Chemours, USA) was added to the ink slurry and mixed for an additional 30 minutes. A 7 cm×7 cm Nafion membrane (NR212, Chemours, USA) was prepared, and the ink slurry manufactured as described above was sprayed on the layer on the cathode side at 0.4 mg cm$^2$. The MEA on the anode side was manufactured in the same manner as the cathode, using a 60 wt % iridium oxide (IrOxide, Boyas Energy, Korea) catalyst and a 5 wt % ionomer dispersion. The amount of iridium oxide to be loaded was kept the same at 2 mg cm$^{-2}$ for all samples.

Comparative Example 2

The dispersion was manufactured in a conventional manner other than supercritical nanodispersion. Specifically, a dispersion was manufactured by stirring 3M 725EW (3M, USA) ionomer powder in a mixed solvent (weight ratio of 55:45) of NPA and ultrapure water at room temperature for 48 hours. Using this dispersion, a film sample and a membrane-electrode assembly were manufactured in the same manner as in Comparative Example 1 above.

Comparative Example 3

A film sample was prepared using a commercially available ionomer dispersion without manufacturing a separate ionomer nanodispersion. Specifically, Nafion D521 (5 wt %, Chemours, USA) was used, which was cast on a glass plate, solidified in a vacuum oven set at 50° C. for 4 hours, and heat treated at 220° C. for 1 hour to manufacture a film sample. Thereafter, the film sample was prepared by treating the film sample in a boiling 0.5 M $H_2SO_4$ aqueous solution for 2 hours and boiling the film sample in ultrapure water for 2 hours to remove excessive $H_2SO_4$ on the surface of the film sample.

In addition, a commercially available 40 wt % Pt/C catalyst (Johnson Matthey, UK) was mixed with ultrapure water and isopropyl alcohol (IPA, Sigma-Aldrich, USA) using a homogenizer (VCX130, Sonics & Materials Inc., USA). Then 5 wt % of commercially available ionomer dispersion (D521) was added to the ink slurry and mixed for an additional 30 minutes. A 7 cm×7 cm Nafion membrane (NR211, Chemours, USA) was prepared, and the ink slurry manufactured above was sprayed on the layer on the cathode side. The MEA was manufactured on the anode side in the same manner as the cathode, using the 40 wt % Pt/C catalyst and commercially available ionomer binder D521 (Chemours, USA). The amount of Pt to be loaded was kept the same at 0.4 mg cm$^{-2}$ for all samples.

Comparative Example 4

Using the same ionomer as used in Example 10, a dispersion was manufactured in a conventional manner rather than a supercritical nanodispersion. Specifically, a dispersion was manufactured by stirring 3M 800EW (3M, USA) ionomer powder in a mixed solvent (weight ratio of 55:45) of NPA and ultrapure water at room temperature for 48 hours.

In addition, a film sample and a membrane electrode assembly were manufactured in the same manner as in Comparative Example 3 using the 3M 800EW ionomer dispersion.

<Experiment for Performance Comparison>
Hydrogen and Oxygen Permeation Behavior

In order to evaluate the hydrogen and oxygen permeation behavior of the ionomer itself to be applied as an electrode binder, except for the catalyst and carbon support constituting an electrode, the hydrogen and oxygen permeability according to the temperature of commercially available ionomer manufactured in the form of film (Comparative Example 1, D521), an ionomer manufactured by a conventional dispersion method without application of nanodispersion (Comparative Example 2, 3M 725EWS), and the samples of nano-dispersed ionomer according to the present invention (Examples 1-3, 3M 725EWN D-1 to D-3) was measured and compared. For accurate comparison, the film was manufactured under the same film manufacturing conditions and the characteristics were measured on the same film thickness.

As shown in FIGS. 1 and 2, as a result of comparing the hydrogen and oxygen permeability of the films manufactured using the nano-dispersed ionomer according to the present invention (Example 3, 3M 725EWN, D-3) and the ionomer manufactured by a conventional dispersion method using an ionomer chemically identical to the ionomer (Comparative Example 2, 3M 725EWN) B, the film using the nano-dispersed ionomer according to the present invention showed more improved hydrogen and oxygen permeability. In addition, as shown in FIG. 3, as a result of comparing the oxygen permeability of the films manufactured using a commercially available ionomer (Comparative Example 3, D521), an ionomer manufactured by a conventional dispersion method without application of nanodispersion (Comparative Example 4, 3M 800EWS), and the nano-dispersed ionomer according to the present invention (Example 10, 3M 800EWN), it shows that this characteristic can help improve the performance of PEFC or PEMWE due to improved mass transfer properties when introducing an electrode.

Unit Cell Performance (Voltage-Current Density)

FIG. 4 is a graph showing a current-voltage curve of MEAs manufactured by introducing the nano-dispersed ionomers according to the present invention (Examples 1 to 3, 3M 725EWN D-1 to D-3), a commercially available ionomer (Comparative Example 1, D521), and the ionomer manufactured by the conventional art without application of nanodispersion (Comparative Example 2, 3M 725EWS), as an electrode binder material, at 80° C. In the case of Example 3, which was nano-dispersed according to the present invention, the current density was 1.75 V@2 A/cm$^2$, which showed excellent MEA performance compared to commercially available Comparative Example 1 (2.14 V@2 A/cm$^2$), and excellent electrochemical properties of MEA compared to Comparative Example 2 (2 V@2 A/cm$^2$) having the same chemical structure.

In addition, FIG. 5 is a graph showing a current-voltage curve of MEAs manufactured by introducing the nano-dispersed ionomer according to the present invention (Example 10, 3M 800EWN), a commercially available ionomer (Comparative Example 3, D521), and the ionomer manufactured by the conventional art without application of nanodispersion (Comparative Example 4, 3M 800EWS), as an electrode binder, into a cathode, under the air condition of 65° C. In the case of Example 10, which was nano-dispersed according to the present invention, the current density was 1.28 A/cm$^2$ @0.6 V, which showed excellent MEA performance compared to Comparative Example 3 (0.90 A/cm$^2$ @0.6 V) using the commercially available ionomer binder (D521), and excellent electrochemical properties of MEA compared to Comparative Example 4 (1.02 A/cm$^2$ @0.6 V) using the ionomer having the same chemical structure. It is determined that the characteristics are due to the securing of mass transfer characteristics due to the improvement of oxygen permeation behavior obtained through the nanodispersion technology under supercritical conditions according to the present invention.

In addition, in the case of Example 11 in which the nano-dispersed ionomer according to the present invention was applied as an electrode binder to both electrodes (cathode and anode), the effect was maximized and showed the best MEA performance (1.4 A/cm$^2$ @0.6 V). These measurement results show that the hydrogen and oxygen permeation behavior is improved through the nanodispersion technology under supercritical conditions according to the present invention, so that suitable mass transfer characteristics can be secured.

Average Particle Size of Ionomer

The following [Table 1] and FIG. 6 show the analysis result of the average particle size of the ionomer in a mixed solvent comprising alcohol and water through dynamic light scatter (DLS) analysis. In the case of Example 1, which was nano-dispersed according to the present invention, the average size was 1.85 nm, which was the smallest size. However, in Example 3, the size was 2.42 nm, which showed a 30.8% increase compared to Example 1. In the case of commercially available Comparative Example 2, even though it has the same chemical structure, it was confirmed as an 8.5% increase compared to 2.23 nm.

TABLE 1

| Sample Code | Z-average particle size (d · nm) |
|---|---|
| (1) Comparative Example 1 | 3.78 |
| (2) Comparative Example 2 | 2.23 |
| (3) Example 1 | 1.85 |
| (4) Example 2 | 2.19 |
| (5) Example 3 | 2.42 |

Durability Test and Evaluation

FIG. 7 shows durability evaluation results showing the effect on PEMWE durability in case where each ionomer is applied as a binder for an electrode. In the case of Example 1, which was nano-dispersed according to the present invention, durability was improved by 29% compared to Comparative Example 1, and in the case of Comparative Example 2, even though it had the same chemical structure, durability was improved by about 15.7%. In the case of Example 3, which had the greatest effect, durability was improved by about 47% compared to Comparative Example 2. This shows that PEMWE performance and durability are improved by improving the hydrogen and oxygen permeation behavior and securing the mass transfer characteristics as well as the unique dispersion characteristics obtained through the introduction of the nanodispersion technology according to the present invention.

Meanwhile, AST was conducted to determine how each ionomer would contribute to PEFC durability in case where each ionomer was applied as a cathode binder. In the case of Example 10, which was nano-dispersed according to the present invention, the initial performance decreased by 6.95% at 0.6 V after AST, and the lowest performance loss rate was shown when compared to Comparative Examples. In the case of Comparative Example 3 using a commercially available ionomer, the initial performance decreased by 12.8% at 0.6 V after AST, and in the case of Comparative Example 4, a performance degradation of about 8.5% occurred even though it had the same chemical structure. This shows that PEFC performance and durability are improved by improving the oxygen permeation behavior and securing mass transfer characteristics, along with the unique dispersion characteristics obtained through the introduction of the nanodispersion technology according to the present invention.

In addition, TEM analysis was conducted to identify the physical change of the electrode after AST. Regardless of the type of binder used, the initial average size of the platinum particles was the same as 3.62 nm. After AST, in the electrode of Comparative Example 3 to which the commercially available ionomer (D521) was applied as an electrode binder, the platinum particles were aggregated and the size thereof grew almost twice as large as 6.26 nm. In contrast, in the electrode of Example 10 in which the nano-dispersed ionomer was applied as an electrode binder according to the present invention, an increase of only about 0.13 nm compared to the initial platinum particle was observed, and it was confirmed that the platinum aggregation did not intensify. In addition, as a result of comparing the platinum particle size with Comparative Example 4, despite having the same chemical structure, it was confirmed that the platinum particles of Comparative Example 4 aggregated to 4.64 nm after AST and were partially aggregated. This is related to the unique dispersion characteristics of the nanodispersion under supercritical conditions according to the present invention, and the agglomeration of platinum particles is prevented through uniform morphology formation through even distribution in the catalyst layer. As a result, it is shown that the durability of the PEFC can be improved through the prevention of loss of the catalytically active area.

The invention claimed is:

1. A method for manufacturing a membrane-electrode assembly for water electrolysis in which a polymer electrolyte membrane is interposed between a cathode and an anode, the method comprising the steps of:
    forming a cathode by applying a first electrode composition on one surface of the polymer electrolyte membrane; and a forming an anode by applying a second electrode composition on another surface of the polymer electrolyte membrane, wherein the first electrode composition comprises a first catalyst and a first ionomer binder, the first catalyst is a metal catalyst adsorbed on a surface of a carbon-based support, and the first ionomer binder is a first nanodispersion of a first ionomer dispersed under supercritical conditions in a mixed solvent comprising alcohol and water, and wherein the second electrode composition comprises a second catalyst and a second ionomer binder, the second catalyst is a metal oxide catalyst, and the second ionomer binder is a second nanodispersion of a second ionomer dispersed under supercritical conditions in a mixed solvent comprising alcohol and water.

2. The method of claim 1, wherein the first ionomer and the second ionomer are at least one selected from among perfluorine-based ionomer, partial fluorine-based ionomer, and hydrocarbon-based ionomer.

3. The method of claim 1, wherein the first ionomer binder and the second ionomer binder are same or different from each other.

4. The method of claim 1, wherein the first ionomer is in a range of 0.1 to 80% by weight based on an entire weight of the first electrode composition and the second ionomer is in a range of 0.1 to 80% by weight based on an entire weight of the second electrode composition.

5. The method of claim 1, wherein in the supercritical conditions of the first nanodispersion and the supercritical conditions of the second nanodispersion, a temperature is in a range of 80 to 300° C., and a pressure is in a range of 0.1 to 17.0 MPa.

6. The method of claim 1, wherein the alcohol of the first nanodispersion and the alcohol of the second nanodispersion include at least one selected from methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol, and a mixture thereof.

7. The method of claim 1, wherein the mixed solvent of the first nanodispersion and the mixed solvent of the second nanodispersion further comprise at least one organic solvent selected from the group consisting of acetone, ethyl carbonate, propylene carbonate, diethyl carbonate, dimethyl carbonate, ethyl methyl carbonate, fluoroethylene carbonate, dimethylacetamide, dimethyl sulfoxide, dimethylformamide, N-methylpyrrolidone, and a mixture thereof.

8. The method of claim 1, wherein a particle size of the first ionomer dispersed in the first nanodispersion or a particle size of the second ionomer dispersed in the second nanodispersion is capable of being controlled by changing a ratio of the alcohol to the water and the supercritical condition.

9. The method of claim 1, wherein the metal of the first catalyst is at least one metal nanoparticle selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and an alloy thereof.

10. The method of claim 1, wherein the carbon-based support of the first catalyst is at least one of the group consisting of carbon black, carbon nanotube, carbon nanofiber, carbon nanowire, carbon nanohorn, and graphene.

11. The method of claim 1, wherein the metal oxide catalyst of the second catalyst is an oxide of at least one metal selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and an alloy thereof.

12. The method of claim 1, wherein the step of forming the cathode by applying the first electrode composition or the step of forming the anode by applying the second electrode composition is performed by any one method selected from spray coating, decal coating, slot-die coating, inkjet printing, brush coating, and direct coating.

13. A membrane-electrode assembly manufactured by the method of claim 1.

14. A water electrolysis device comprising the membrane-electrode assembly of claim 13.

* * * * *